(12) United States Patent
Fukushima

(10) Patent No.: US 10,001,959 B2
(45) Date of Patent: *Jun. 19, 2018

(54) USER INTERFACE FOR REDIRECTION OF PRINT JOBS

(71) Applicant: KYOCERA Document Solutions Inc., Osaka (JP)

(72) Inventor: Keisuke Fukushima, Concord, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/484,384

(22) Filed: Apr. 11, 2017

(65) Prior Publication Data

US 2017/0220305 A1 Aug. 3, 2017

Related U.S. Application Data

(63) Continuation of application No. 14/672,348, filed on Mar. 30, 2015, now Pat. No. 9,652,190.

(51) Int. Cl.
*G06F 3/12* (2006.01)
*H04N 1/00* (2006.01)

(52) U.S. Cl.
CPC ............ *G06F 3/1261* (2013.01); *G06F 3/121* (2013.01); *G06F 3/1234* (2013.01); *G06F 3/1286* (2013.01)

(58) Field of Classification Search
CPC ........ G06F 3/121; G06F 3/126; G06F 3/1261; G06F 3/1234; G06F 3/1246; G06F 3/1252; G06F 3/1285; G06F 3/1286

USPC ....... 358/1.1–1.18; 348/734, E5.102, E5.103
See application file for complete search history.

(56) References Cited

U.S. PATENT DOCUMENTS

| | | | |
|---|---|---|---|
| 7,702,130 B2 * | 4/2010 | Im | G06F 3/017 382/103 |
| 9,652,190 B2 * | 5/2017 | Fukushima | G06F 3/1285 |
| 2002/0062407 A1 | 5/2002 | Tateyama et al. | |
| 2004/0196400 A1 * | 10/2004 | Stavely | G06F 3/017 348/333.01 |
| 2005/0086282 A1 * | 4/2005 | Anderson | G06F 17/30899 709/200 |
| 2011/0242565 A1 | 10/2011 | Armstrong | |
| 2014/0185872 A1 | 7/2014 | Kim et al. | |
| 2015/0169165 A1 | 6/2015 | Bacus | |
| 2015/0262362 A1 * | 9/2015 | Zaytsev | G06K 9/6202 382/103 |

* cited by examiner

*Primary Examiner* — Gabriel Garcia
(74) *Attorney, Agent, or Firm* — McDonnell Boehnen Hulbert & Berghoff LLP

(57) ABSTRACT

The present disclosure is directed to a method and user interface for redirecting print jobs. The method involves receiving a notification indicating that execution of a print job at a first printing device failed. The method also involves displaying a network printing device map on a display unit in response to receiving the notification. The network printing device map is a graphical representation of a network topology of a plurality of printing devices within a local network. The method further involves receiving an input gesture indicative of a selection of a second printing device of the plurality of printing devices with which to execute the print job. Additionally, the method involves causing the first printing device to transmit the print job to the second printing device upon receiving the input gesture.

18 Claims, 12 Drawing Sheets

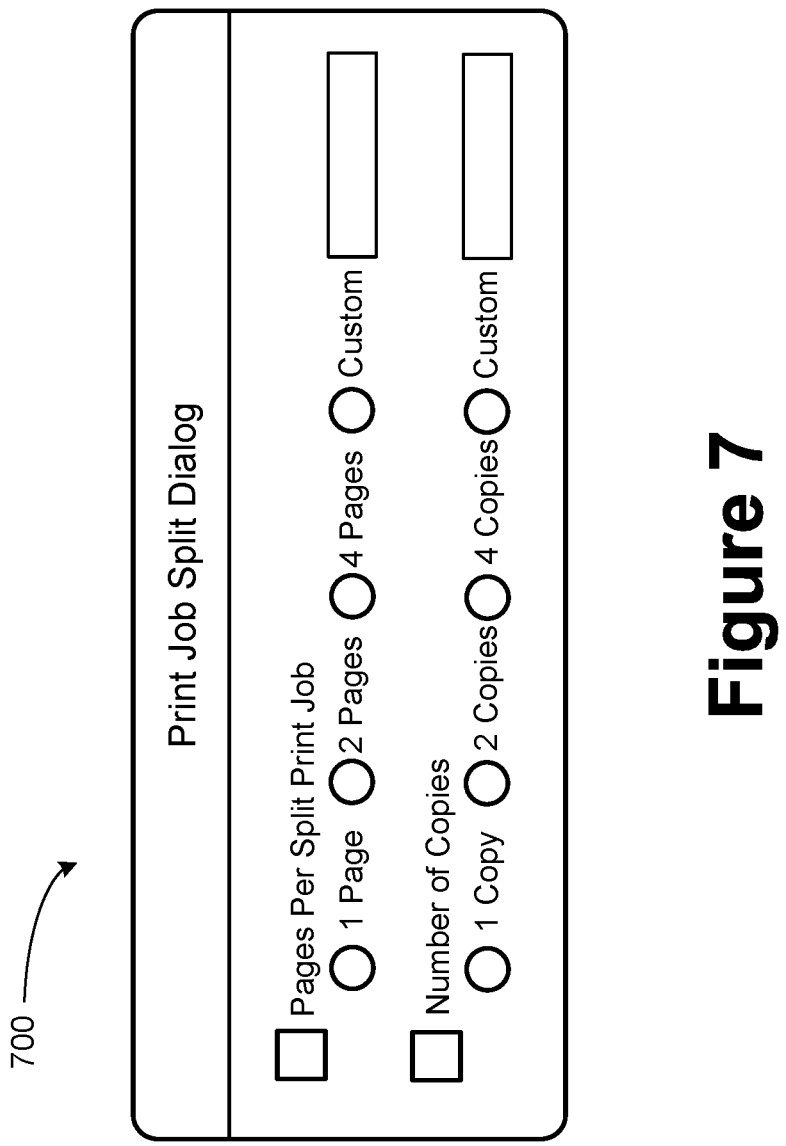

USER INTERFACE FOR REDIRECTION OF PRINT JOBS

CROSS-REFERENCE TO RELATED APPLICATION

This application is a continuation of and claims the benefit of priority from U.S. patent application Ser. No. 14/672,348, filed Mar. 30, 2015, which is hereby incorporated herein by reference in its entirety.

BACKGROUND

Unless otherwise indicated herein, the materials described in this section are not prior art to the claims in this application and are not admitted to be prior art by inclusion in this section.

In a typical printing process, a computing device sends a print job—or printable data representative of a document or an image—to a printing device. Upon receiving the print job, the printing device then executes the print job. However, in some circumstances, the printing device may not be able to execute or finish execution of a print job. For instance, a printing device may experience an error (e.g. a paper jam) that requires the printing device to be serviced before beginning or resuming printing. As another example, a printing device may run out of printing supplies (e.g. paper, ink, toner, etc.) necessary to perform printing, which must be replenished before carrying out additional print jobs. In such circumstances, a typical printing device halts operation, preventing a print job from being carried out or prematurely ending a print job in progress.

In some systems, a printing device may alert or notify the computing device that requested execution of the print job that the print job could not be performed or completed. A user may then choose to perform the print job on a different printing device if the network contains multiple printing devices. However, this presents an inconvenience to the user, who must repeat the process of opening a desired document or image, selecting a print operation, choosing an alternative printing device, and then traveling to that alternative printing device.

In some situations, a user may request printing of a document and begin walking to the selected printing device before an error occurs. As a result, that user may not be aware of such an error until that user reaches the printing device and discovers that the print job was not completed. The user must then return to that user's computing device and repeat the printing process and select an alternative printing device with which to execute the print job.

SUMMARY

The present application discloses embodiments that relate to a method and user interface for redirecting print jobs. In one aspect, the present application describes a method. The method involves receiving a notification indicating that execution of a print job at a first printing device failed. The method also involves displaying a network printing device map on a display unit in response to receiving the notification. The network printing device map is a graphical representation of a network topology of a plurality of printing devices within a local network. The method further involves receiving an input gesture indicative of a selection of a second printing device of the plurality of printing devices with which to execute the print job. Additionally, the method involves causing the first printing device to transmit the print job to the second printing device upon receiving the input gesture.

In another aspect, the present application describes a device. The device includes a network interface, a storage medium, a network discovery unit, an operation panel, and at least one processor. The network interface is configured to connect to a local network. The storage medium is configured to store a print job. The network discovery unit is configured to communicate with other printing devices via the network interface to receive network topology information. The operation panel includes a display unit configured to display a network printing device map and an input unit configured to receive input gestures. The at least one processor is configured to execute instructions. The instructions include receiving a notification indicating that execution of the print job at the printing device failed. The instructions also include displaying the network printing device map on the display unit in response to receiving the notification. The network printing device map is a graphical representation of a network topology of a plurality of printing devices within the local network. The instructions further include receiving, at the input unit of the operation panel, an input gesture indicative of a selection of a second printing device of the plurality of printing devices with which to execute the print job. Additionally, the instructions include transmitting, via the network interface, the print job stored on the storage medium to the second printing device upon receiving the input gesture.

In yet another aspect, the present application describes a system. The system includes a plurality of printing devices and a computing device. The plurality of printing devices are each communicatively connected to a local network and configured to perform network topology discovery services. The network topology discovery services include (i) transmitting discovery command packets that request network information from neighboring printing devices and (ii) receiving discovery response packets that represent a portion of a network topology of the local network. The computing device is communicatively connected to the local network and includes a display unit and an input unit. The computing device is configured to execute instructions. The instructions include receiving, from at least one printing device of the plurality of printing devices, one or more discovery response packets. The instructions also include generating a network printing device map based on the received one or more discovery response packets. The instructions further include receiving a notification indicating that execution of a print job at a first printing device of the plurality of printing devices failed. Additionally, the instructions include displaying, on the display unit, the generated network printing device map. Further, the instructions include receiving, from the input unit, a selection of a second printing device of the plurality of printing devices with which to execute the print job. The instructions also include causing the first printing device to transmit the print job to the second printing device.

In still another aspect, the present application describes a system. The system includes a means for receiving a notification indicating that execution of a print job at a first printing device failed. The system also includes a means for displaying a network printing device map on a display unit in response to receiving the notification. The network printing device map is a graphical representation of a network topology of a plurality of printing devices within a local network. The system further includes a means for receiving an input gesture indicative of a selection of a second printing device of the plurality of printing devices with which to execute the print job. Additionally, the system includes a means for causing the first printing device to transmit the print job to the second printing device upon receiving the input gesture The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 7 is a graphical representation of a print job split dialog, according to an example embodiment.

DETAILED DESCRIPTION

Figure 1:
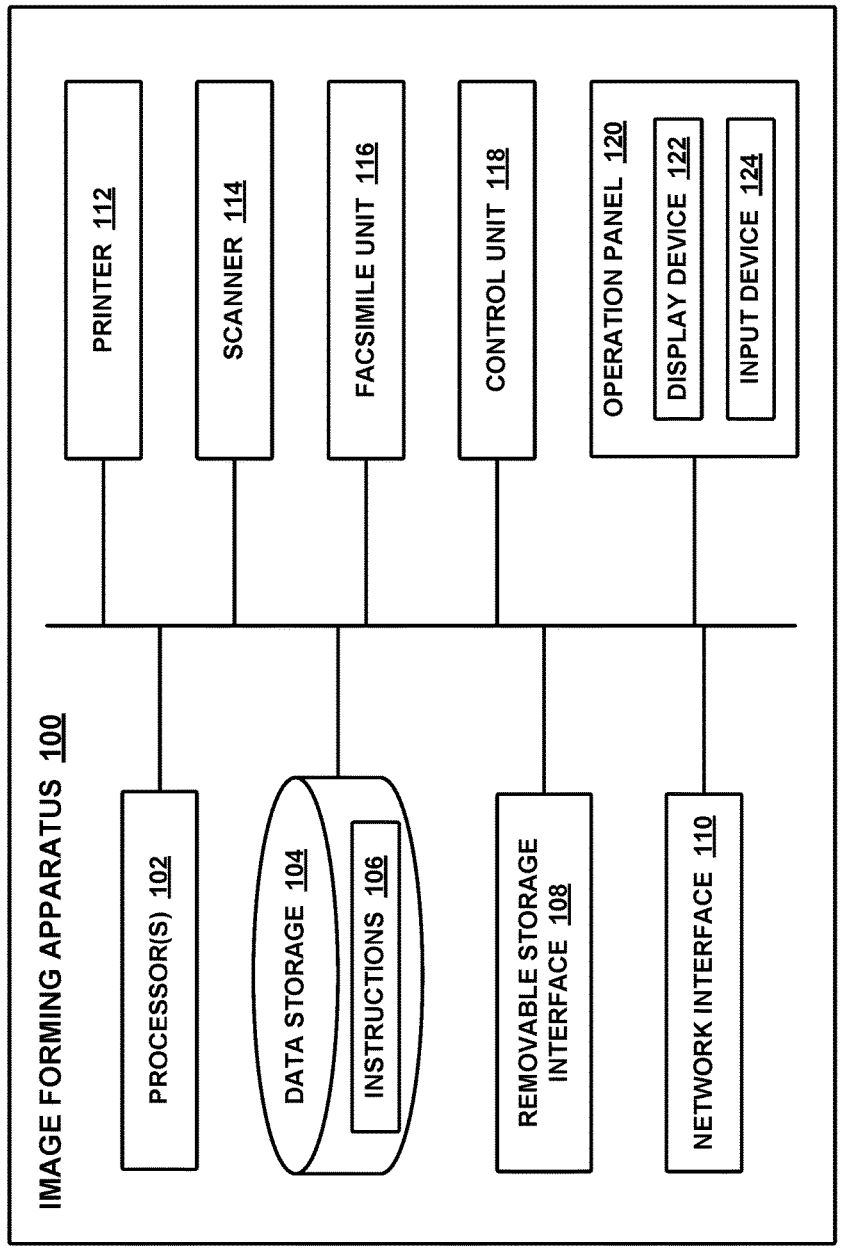
FIG. 1 is a schematic block diagram illustrating an image forming apparatus, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

An example embodiment involves a method and user interface for redirecting a print job. A computing device may transmit a request to execute a print job to a printing device. If the printing device is operational, it may proceed with executing the print job. However, the printing device may fail to complete execution of that print job if, for example, the printing device experiences an error—such as a paper jam or depletion of printing supplies, among other possible errors—while performing that print job. In such instances, execution of the print job may be terminated before it is fully carried out, resulting in only a partial completion of the print job. In some situations, a printing device may fail to even begin executing a received print job, such as when the printing device has previously experienced an error that has not yet been fixed or when the printing device is offline or otherwise is not connected to the network, among other possible situations.

According to various embodiments, the printing device that failed to execute the print job may provide a means for redirecting the print job to be carried out on a different printing device. In some embodiments, a printing device may include an operation panel configured to provide a user interface for print job redirection. Upon detection of a failed print job, the printing device may perform various operations in order to determine a network topology—or the arrangement of networked devices, including other printing devices and/or peripheral devices—of devices within the local network to which the printing device is connected. The printing device may then generate a network printing device map based on the gathered network topology information. The operation panel may include an input device (e.g. a mouse, buttons, and/or a touch screen) that receives an input gesture indicating a selection of an alternative printing device with which to carry out the print job. Upon receiving this selection of the alternative printing device, the printing device may transmit (i.e. "redirect") the print job to the selected alternative printing device.

In some embodiments, the above-described operation panel may be provided on a client device, mobile computing device, and/or other computing device separate from the printing device at which execution of the print job failed. In these embodiments, the computing device may act as a "remote" operation panel that receives information from the printing device and uses that information as a basis for providing the print job redirection user interface. In some implementations, such a computing device may first receive a notification from the printing device indicating that execution of the print job failed. Then, the computing device may either instruct the printing device to generate the network printing device map or, in some cases, perform operations to generate the network printing device map on the computing device. Upon receiving a selection of an alternative printing device, the computing device acting as a remote operation panel may then instruct the printing device to redirect the print job to the alternative printing device.

Generating a network printing device map may involve an iterative or recursive process by which discovery packets are distributed to various networked devices and response information is collected from those networked devices. In an example network topology discovery process, an initial printing device is instructed to transmit discovery command packets to one or more devices within the network. Upon receiving those discovery command packets, the one or more devices may transmit additional discovery command packets to other devices within the network. When all devices within a given network have received a discovery command packet, the process is performed in reverse, whereby a given device responds to the device that transmitted to it a discovery command packet with a discovery response packet, which may include information about that device and its network information. A device receiving one or more discovery response packets might use those packets as a basis to determine a sub-network topology (i.e. a portion of the network topology). Devices collecting multiple discovery response packets and/or information about sub-network topologies may amalgamate that information to form larger portions of the network topology. Finally, the initial printing device may receive all discovery response packets and sub-network topology information and use that information as a basis to formulate a complete network topology. The printing device may use at least a portion of the network topology as a basis for generating the network printing device map. Some example network discovery services include Link Layer Topology Discovery (LLTD) and Link Layer Discovery Protocol (LLDP), among other protocols and/or services.

In some embodiments, an operation panel may be configured to recognize or detect input gestures from an input device, such as a mouse or touch-screen digitizer. The input gestures may, in addition to providing a means for selecting an alternative printing device at which to redirect a print job, cause the user interface to graphically display information about the print job, printing devices within the network printing device map, provide additional operations that can be executed in association with the print job, and/or cause performance of at least one of those additional operations.

Note that, as described herein, "redirection" of a print job may refer to one or more operations that transmit, forward, or otherwise send the print job from one printing device to another. The first printing device may have a memory or storage device thereon that temporarily stores the print job for execution. If execution of that print job fails at that first printing device, a processor or control unit of that first printing device may then transmit or otherwise provide the print job stored thereon to another printing device. Thus, "redirection" may involve instructing a first printing device to transmit that print job along to a second printing device, without necessarily having to re-transmit the print job from the computing device that originally requested execution of that print job by the first printing device.

II. Example Image Forming Apparatuses

FIG. 1 is a schematic block diagram of illustrating an image forming apparatus 100, according to an example embodiment. The image forming apparatus 100 includes processor(s) 102, data storage 104 that has stored thereon instructions 106, a removable storage interface 108, a network interface 110, a printer 112, a scanner 114, a facsimile (FAX) unit 116, a control unit 118, and an operation panel 120 that includes a display device 122 and an input device 124. Each unit of image forming apparatus 100 may be connected to a bus, allowing the units to interact with each other. For example, the processor(s) 102 may request information stored on data storage 104.

The processor(s) 102 may include one or more processors capable of executing instructions, such as instructions 106, which cause the image forming apparatus 100 to perform various operations. The processor(s) 102 may include general-purpose central processing units (CPUs) and cache memory. The processor(s) 102 may also incorporate processing units for specific purposes, such as application-specific integrated circuits (ASICs) and field-programmable gate arrays (FPGAs). Other processors may also be included for executing operations particular to image forming apparatus 100.

The data storage 104 may store thereon instructions 106, which are executable by the processor(s) 102. The data storage 104 may also store information for various programs and applications, as well as data specific to the image forming apparatus 100. For example, the data storage 104 may include data for running an operating system (OS). In addition, the data storage 104 may store user data that includes various kinds of information about any number of users. The data storage 104 may include both volatile memory and non-volatile memory. Volatile memory may include random-access memory (RAM). Some examples of non-volatile memory include read-only memory (ROM), flash memory, electrically erasable programmable read only memory (EEPROM), digital tape, a hard disk drive (HDD), and a solid-state drive (SSD). The data storage 104 may include any combination of readable and/or writable volatile memories and/or non-volatile memories, along with other possible memory devices.

The removable storage interface 108 may allow for connection of external data storage, which may then be provided to the processor(s) 102 and/or the control unit 118 or copied into data storage 104. The removable storage interface 108 may include a number of connection ports, plugs, and/or slots that allow for a physical connection of an external storage device. Some example removable storage devices that may interface with image forming apparatus 100 via the removable storage interface 108 include USB flash drives, secure-digital (SD) cards (including various shaped and/or sized SD cards), compact discs (CDs), digital video discs (DVDs), and other memory cards or optical storage media.

The network interface 110 allows the image forming apparatus 100 to connect to other devices over a network. The network interface 110 may connect to a local-area network (LAN) and/or a wide-area network (WAN), such as the Internet. The network interface may include an interface for a wired connection (e.g. Ethernet) and/or wireless connection (e.g. Wi-Fi) to a network. The network interface 110 may also communicate over other wireless protocols, such as Bluetooth, radio-frequency identification (RFID), near field communication (NFC), 3G cellular communication such as CDMA, EVDO, GSM/GPRS, or 4G cellular communication, such as WiMAX or LTE, among other wireless protocols. Additionally, the network interface 110 may communicate over a telephone landline. Any combination of wired and/or wireless network interfaces and protocols may be included in network interface 110.

The printer 112 may be any device or peripheral capable of producing persistent human-readable images and/or text on a printing medium, such as paper. The printer 112 may receive print data from other units of image forming apparatus 100 representing images and/or text for printing. The printer 112 may employ a variety of technologies, such as ink-based printing, toner-based printing, and thermal printing, among other technologies. An assortment of mechanical and/or electro-mechanical devices may make up the printer 112 to facilitate the transportation of printing media and the transferring of images and/or text onto the printing media. For example, the printer 112 may include trays for the storage and staging of printing media and rollers for conveying the printing media through the printer 112. The printer 112 may also include ink heads for dispensing ink onto a printing medium, photosensitive drums onto which lasers are shone to charge the drums and attract toner that is transferred onto a printing medium, and/or a thermal head for heating certain areas of a printing medium to generate images and/or text. Other devices may also be incorporated within printer 112.

The scanner 114 may be any device that can scan a document, image, or other object (which may collectively be referred to as "scanning medium" hereinafter) and produce a digital image representative of that scanning medium. The scanner 114 may emit light (e.g. via LEDs) onto the scanning medium and sense the light reflecting off the scanning medium (e.g. via a charge coupled device (CCD) line sensor or a complementary metal oxide semiconductor (CMOS) line sensor). In some implementations, the scanner 114 includes a platen glass onto which a document may be placed to be scanned. In addition, the scanner 114 may perform post-processing on the scanned image, such as rotation, compression of the data, and/or optical character recognition (OCR), among other post-processing operations.

The facsimile unit 116 may scan a document and/or images (which may be collectively referred to as "printed material" hereinafter) and transmit the scanned printed material over a telephone line (i.e. fax the scanned printed material). The facsimile unit 116 may fax the scanned printed material via the network interface 110. The facsimile unit 116 may also receive a fax transmission and communicate the received data to the printer 112 for printing. In some implementations, the facsimile unit 116 includes buttons for configuring the facsimile unit 116 and dialing a phone number and a display for displaying the status of the fax transmission, among other things.

The control unit 118 may control various electrical and/or mechanical components of the image forming apparatus 100. For example, the control unit 118 may operate one or more paper sheet feeders, conveyors, rollers, and other mechanical devices for transporting paper through the printer 112. The control unit 118 may also include device drivers that facilitate network communication, electronic displays, and the reading of information from various sensors or readers coupled to the image forming apparatus 100. In some implementations, the control unit 118 is a software application or program that interfaces the processor(s) 102 with the various units of the image forming apparatus 100.

The operation panel 120 includes a display device 122 and an input device 124 for facilitating human interaction with the image forming apparatus 100. The display device 122 may be any electronic video display, such as a liquid-crystal display (LCD). The input device 124 may include any combination of devices that allow users to input information into the operation panel 120, such as buttons, a keyboard, switches, and/or dials. In addition, the input device 124 may include a touch-screen digitizer overlaid onto the display device 122 that can sense touch and interact with the display device 122.

Figure 2:
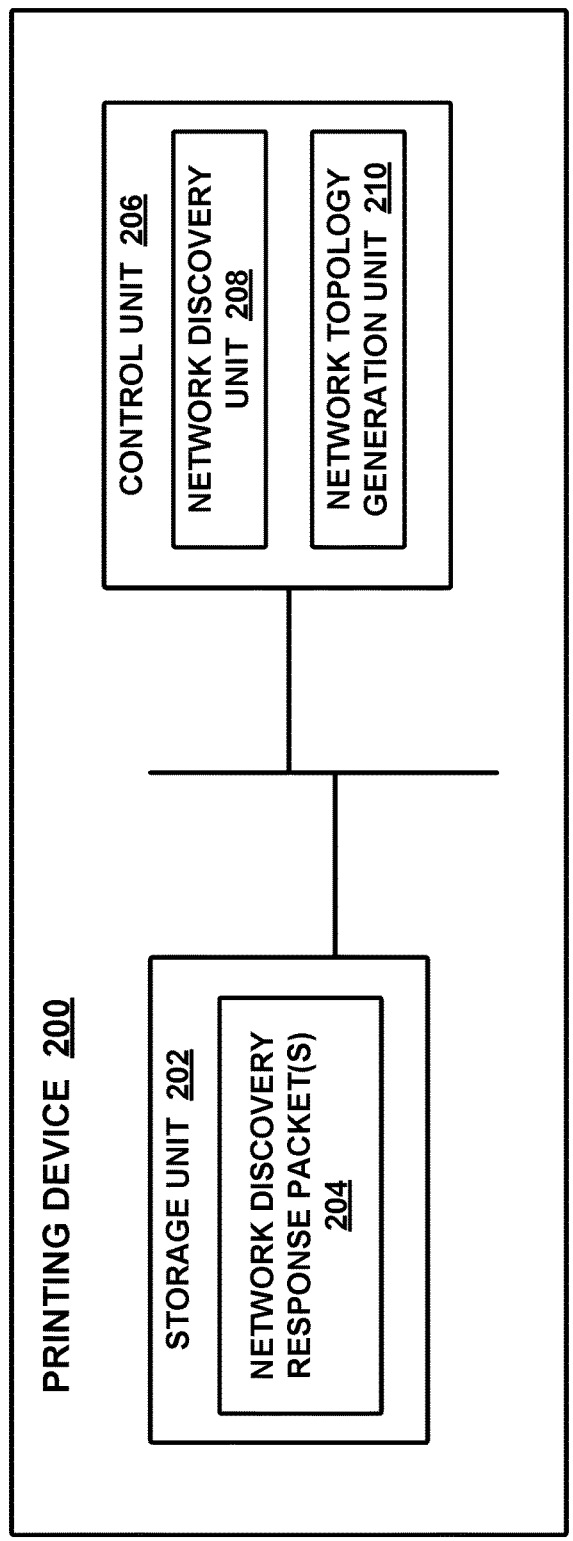
FIG. 2 is a schematic block diagram illustrating a printing device, according to an example embodiment.

FIG. 2 is a schematic block diagram illustrating a printing device 200, according to an example embodiment. The printing device 200 includes a storage unit 202 and a control unit 206. The storage unit 202 stores network discovery response packet(s) 204, among other kinds of information. The control unit 206 includes a network discovery unit 208 and a network topology generation unit 210. The printing device 200 may also include any combination of units of image forming apparatus 100.

The storage unit 202 may be volatile storage (e.g. RAM), non-volatile storage (e.g. HDD, SSD, and/or flash memory), or a combination thereof configured to store information used in generating a network topology map, among other possible kinds of information. Data stored on the storage unit 202 may be accessed by the network discovery unit 208 and/or the network topology generation unit 210 in order to carry out methods and/or operations of the present application. For the purposes of this application, the storage unit 202 may also be referred to herein as a "storage medium."

The network discovery response packet(s) 204 may include one or more discovery response packets gathered during the network discovery techniques of the present application. During operation, the printing device 200 may, in response to transmitting discovery command packets to devices within a network, receive one or more discovery response packet(s) 204 indicative of information about a respective one or more devices capabilities and network configuration. These discovery response packet(s) 204 may be stored in the storage unit 202. These network discovery techniques are described in further detail below.

The control unit 206 may be a combination of hardware and/or software configured to control electrical and/or mechanical components of the printing device 200. The control unit 206 may be implemented as software instructions executed by a processor. In some embodiments, the control unit 206 may be implemented as firmware. Various operational aspects of the printing device 200 may be controlled through the control unit 206. Operations of printing device 200 may be invoked through the control unit 206 from instructions by computing devices, other printing devices, and/or image forming apparatuses.

The network discovery unit 208 may be any combination of software operations and modules for assisting in the formulation and determination of a network topology. The network discovery unit 208 may receive instructions from a computing device to initiate the network topology generation process and responsively transmit one or more discovery command packets to devices within the network. The network discovery unit 208 may also receive a discovery command packet and determine whether or not to transmit discovery command packets to other networked devices. This may involve determining whether the printing device 200 is communicatively connected to any devices that have not yet received a discovery command packet. If one or more devices have not yet received a discovery command packet, the network discovery unit 208 may transmit discovery command packets to those one or more devices. If all networked devices to which the printing device 200 is communicatively connected have already received discovery command packets, the network discovery unit 208 may generate a discovery response packet that includes information about the capabilities (e.g. color printing, stapling options, duplex printing, etc.) of printing device 200, information about the network configuration (e.g. IP address, MAC address, a port number, etc.) of printing device 200, and/or information about the status of the printing device 200 (e.g. whether or not the printing device 200 is busy, whether or not the printing device 200 is operational, etc.). Then, the network discovery unit 208 may transmit the generated discovery response packet to the device from which it received the discovery command packet. In some implementations, the network discovery unit 208 may incorporate features of an LLTD Mapper and/or an LLTD Responder, among other features.

The network topology generation unit 210 may be any combination of software operations and modules for formulating a network topology and/or generating a network printing device map. If printing device 200 is an initial printing device that collects network discovery response packet(s) 204 for an entire network, the network topology generation unit 210 may analyze those discovery response packet(s) 204 and generate a full network topology based on information derived from the analysis of those discovery response packet(s). Thus, in some implementations, the network topology generation unit 210 may implement features of an LLTD Mapper. Then, in some embodiments, the network topology generation unit 210 may generate the user interface that includes a graphical representation of the determined network topology. This may involve determining a manner in which to arrange one or more networked printing devices as a representation of the network topology and selecting appropriate graphical elements or images with which to display each networked printing device present in the network topology, among other operations.

A "unit" as referred to herein may refer to a device, component, module, or other combination of electrical and/or mechanical elements that accomplish a particular task. In some instances, a unit may refer to a physical device that performs certain activities, such as the facsimile unit 116. In other instances, a unit may refer to a software module that executes operations for a certain purpose, such as the network discovery unit 208. Regardless of the combination of hardware and software components that make up a unit, it should be understood that units are operable to accomplish certain tasks, and may interact with other units through hardware and/or software interfaces.

Image forming apparatuses referred to herein may incorporate any combination of components from image forming apparatus 100 and/or printing device 200, among other possible components. For instance, an image forming apparatus may include a power supply that converts electrical power for use by various components. It should be understood that other additional components might also be included on a particular image forming apparatus.

III. Example Systems

Figure 3:
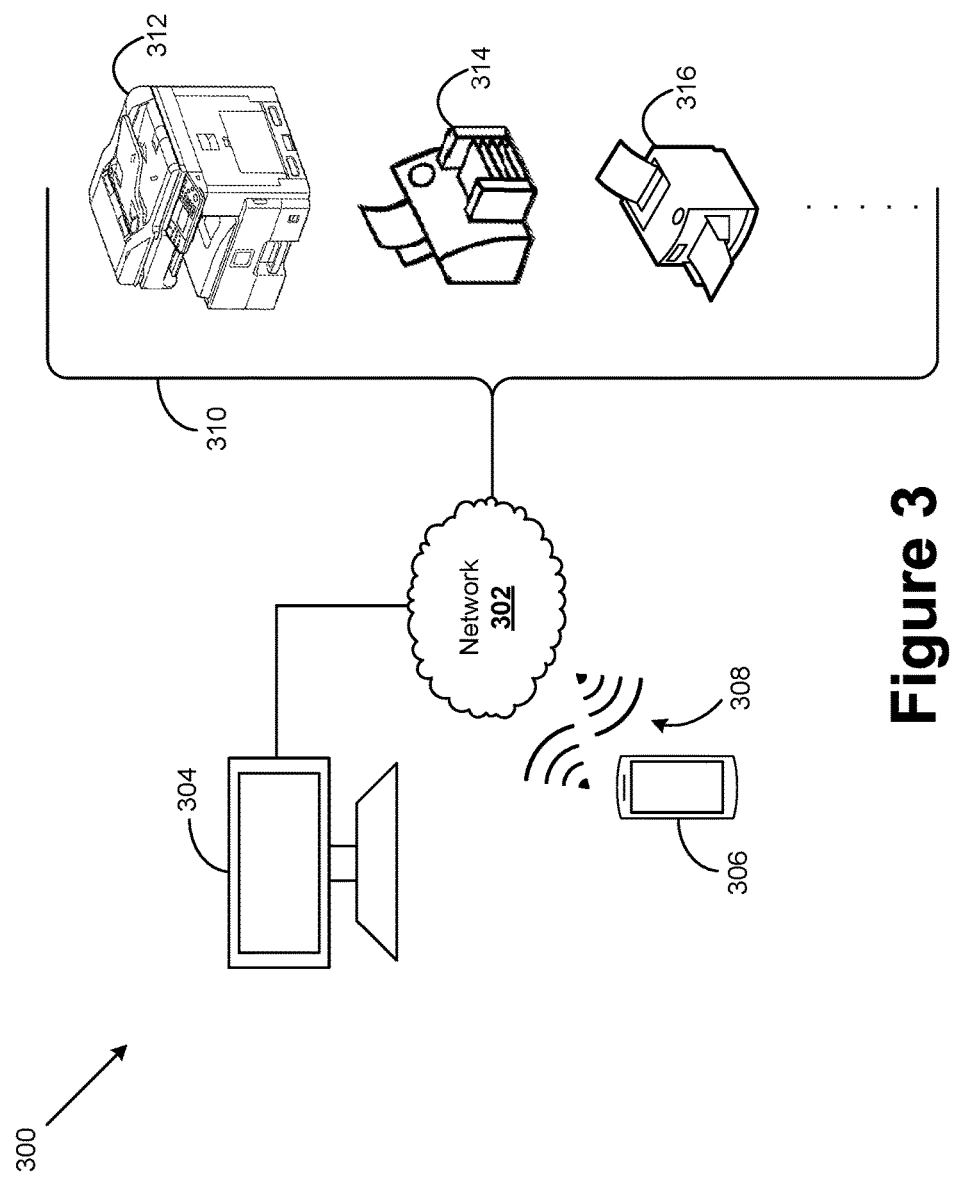
FIG. 3 is a schematic block diagram of a system, according to an example embodiment.

FIG. 3 is a schematic block diagram of a system 300, according to an example embodiment. The system 300 includes a network 302 that communicatively connects client device 304, mobile computing device 306, and printing devices 310. The printing devices 310 include a first printing device 312, a second printing device 314, and a third printing device 316.

The network 302 may be a local area network (LAN) that assigns IP addresses to the client device 304, the mobile computing device 306, and the printing devices 310. In some embodiments, the network 302 may include one or more routing devices that provide wired and/or wireless connections to the various devices within the system. In embodiments with two or more routers, some of those routers might provide a "subnet" (i.e. a logical subdivision of the network 302) that has its own set of IP addresses. As one specific example, one router may provide IP addresses within the range of 192.168.0.1 to 192.168.0.255, while a different router may provide IP addresses within the range of 192.168.1.1 to 192.168.1.255. In this example, a particular subnet may be identified with the first three of the four numbers in the IP address (e.g. one subnet is 192.168.0.X, whereas the other subnet is 192.168.1.X). When multiple routers comprise the network 302, certain devices in the network 302 may connect a given router, while other devices connect to other routers.

The client device 304 may be a desktop computing device connected to the network 302 over a wired connection, such as over Ethernet. The client device 304 may send an initial request to execute a print job on one of the printing devices 310. The client device 304 might provide a display device for displaying a print job redirection user interface and/or an input device for receiving a selection of an alternative printing device from among the printing devices 310 at which to redirect a print job.

The mobile computing device 306 may be any portable computing device, such as a smart phone or tablet. The mobile computing device 306 may be connected to the network 302 via the wireless connection 308. The wireless connection 308 may be Wi-Fi (including 802.11a/b/g/n/ac operating around 2.4 GHz and/or 5 GHz Wi-Fi bands, among other possible Wi-Fi standards), Wi-Fi Direct, and/or Bluetooth, among other possible kinds of wireless communication. The mobile computing device 306 may perform any of the operations described above with respect to client device 304.

The printing devices 310 may include one or more printing devices connected to the network 302. Each printing device may provide different kinds of functionality. For example, the first printing device 312 may be a multi-function peripheral (MFP) capable of performing printing, scanning, and/or faxing, among other operations. The second printing device 314 and the third printing device 316 may be different models of networked printing devices. The printing devices 310 may include any combination of networked printing devices.

Some printing devices of the printing devices 310 may be configured to provide network discovery services. For example, some printing devices might be similar to the printing device 200, and include a network discovery unit and/or a network topology generation unit. Certain printing devices may also be equipped with an operation panel. Some printing devices may incorporate functionality for providing information about its capabilities, network configuration, and/or status, among other kinds of information.

It should be understood that the system 300 is an example system that is provided for explanatory purposes. Any number of mobile devices, computers, laptops, terminal apparatuses, printing devices, and/or peripheral devices may be present and connected to the network 302 in a variety of ways.

IV. Example Methods

Figure 4:
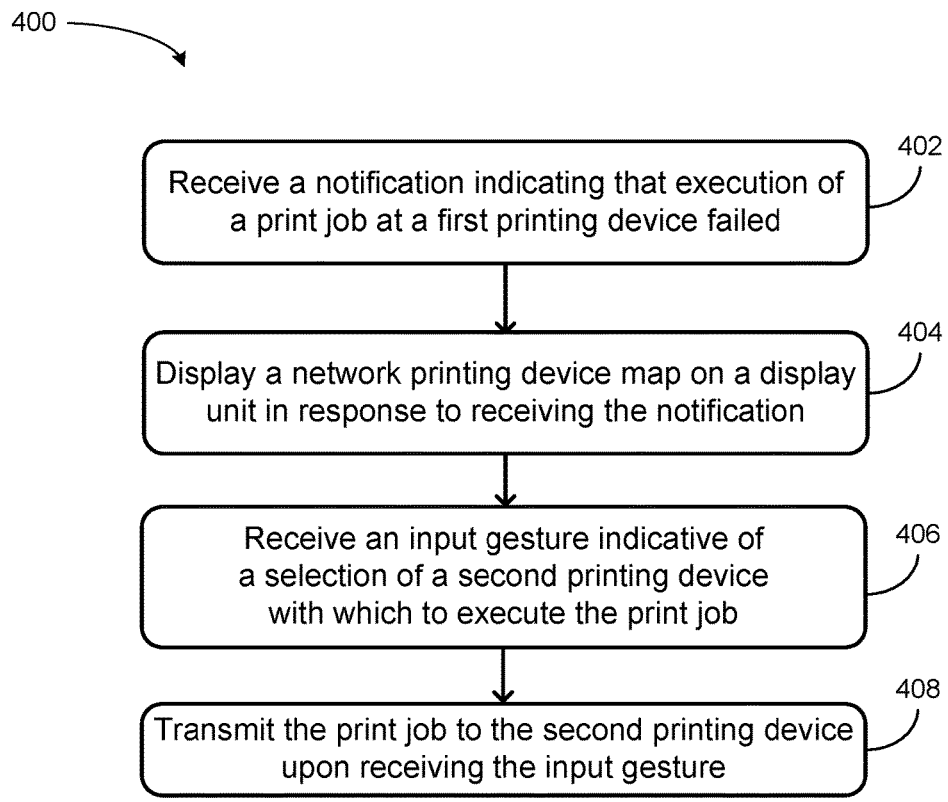
FIG. 4 is a flowchart illustrating a method, according to an example embodiment.

FIG. 4 is a flowchart illustrating a method 400, according to an example embodiment. The method 400 may be one example set of operations that collectively performs print job redirection of the present application. Operations of method 400 may be performed on one or more devices in the system 300 shown in FIG. 3. For the purposes of explanation, the method 400 is described as being performed by the first printing device, which may include an operation panel and be similar to the printing device 200 and/or the image forming apparatus 100. However, it should be understood that a client device, mobile computing device, or any other computing device may provide a "remote" operation panel as described above and implement the operations of method 400 thereon in order to redirect a print job.

At step 402, the method 400 involves receiving a notification indicating that execution of a print job at a first printing device failed. A processor and/or control unit of the first printing device may detect the failure of a print job, which might be caused by a variety of reasons. As described above, a print job might fail due to a depletion of printing supplies, a paper jam, or as a result of a mechanical and/or electrical malfunction. When such an error occurs, a notification may be provided to the processor and/or control unit of the first printing device.

In embodiments where a remote operation panel is provided on a computing device separate from the first printing device, this notification of step 402 may be transmitted by the first printing device to such a computing device via a network. The computing device may receive the notification and determine that the print job failed at the first printing device.

At step 404, the method 400 involves displaying a network printing device map on a display unit in response to receiving the notification. An operation panel of the first printing device may include such a display unit. A processor and/or control unit of the first printing device may cause the operation panel to display the network printing device map upon receiving the notification.

In embodiments where a remote operation panel is provided on a computing device separate from the first printing device, the first printing device may instruct the computing device to display the network printing device map. In some implementations, the computing device may cause its display unit to display the network printing device map upon receiving the notification.

In various embodiments, method 400 may involve generating the network printing device map prior to displaying the network printing device map. In some instances, a network printing device map may already be generated and stored on a storage device; in these instances, step 404 may involve first retrieving the previously-generated network printing device map before displaying it.

At step 406, the method 400 involves receiving an input gesture indicative of a selection of a second printing device with which to execute the print job. An operation panel of the first printing device may include an input device that provides a means for receiving the input gesture. Some example input devices include a mouse, buttons, and/or a touch-screen digitizer, among other possible input devices. The input gesture may be a combination of interactions—from, for example, a user—with the input device of the operation panel. The input gesture may include a combination of button presses, clicks, taps, presses, holding, dragging, and/or repeating any of those actions in quick succession, among other possible actions.

One example input gesture might be a drag-and-drop gesture. In this example, a user may click, press, or tap on a graphical element displayed as a part of the user interface with the network printing device map. Before releasing the click, press, or tap (e.g. while still "holding" the click, tap, or press), the user may drag that graphical element from its original location to a different location in the user interface. In one example implementation, a user performing a drag-and-drop gesture of a print job graphical object onto a printing device may be interpreted as the user wishing to redirect the print job to that printing device. Some input gestures, such as the example drag-and-drop operation, might be indicative of a selection of a second printing device. Example input gestures are contemplated in the description below with respect to FIGS. 6A-6F.

The input device, processor, and/or control unit of a printing device may include control circuitry and/or built in software or hardware for recognizing certain input gestures. Simple gestures, such as taps or clicks, might be readily understood by the operation panel. Other complex gestures that involve a combination of taps, clicks, dragging, swiping, and/or repetition might be interpreted using software techniques in order to determine the intended gesture and its associated operation.

At step 408, the method 400 involves transmitting the print job to the second printing device upon receiving the input gesture. Transmitting the print job may involve instructing or otherwise causing the first printing device to transmit the print job (which may be stored on a memory or storage device of the first printing device) to the second printing device.

In some cases, the first printing device may be wired or wirelessly connected to a router. The first printing device may first send the print job to that router. If the second printing device is within the same subnet (e.g. is connected to the same router or a different router acting as a network switch or bridge), that router may then transmit the print job to that second printing device. If the second printing device is located within a different subnet, the router may determine which router controls that different subnet and send the print job to that router. The router that controls the different subnet may then send the print job to the printing device. Depending on the particular network layout, a print job may be sent to multiple routers before being provided to the second printing device.

It should be understood that the steps 402-408 might be performed in a different order than that presented in FIG. 4. Various steps and operations may be performed in parallel as well. The order of the operations depicted is provided for explanatory reasons and is merely one example combination of operations for print job redirection.

Figure 5:
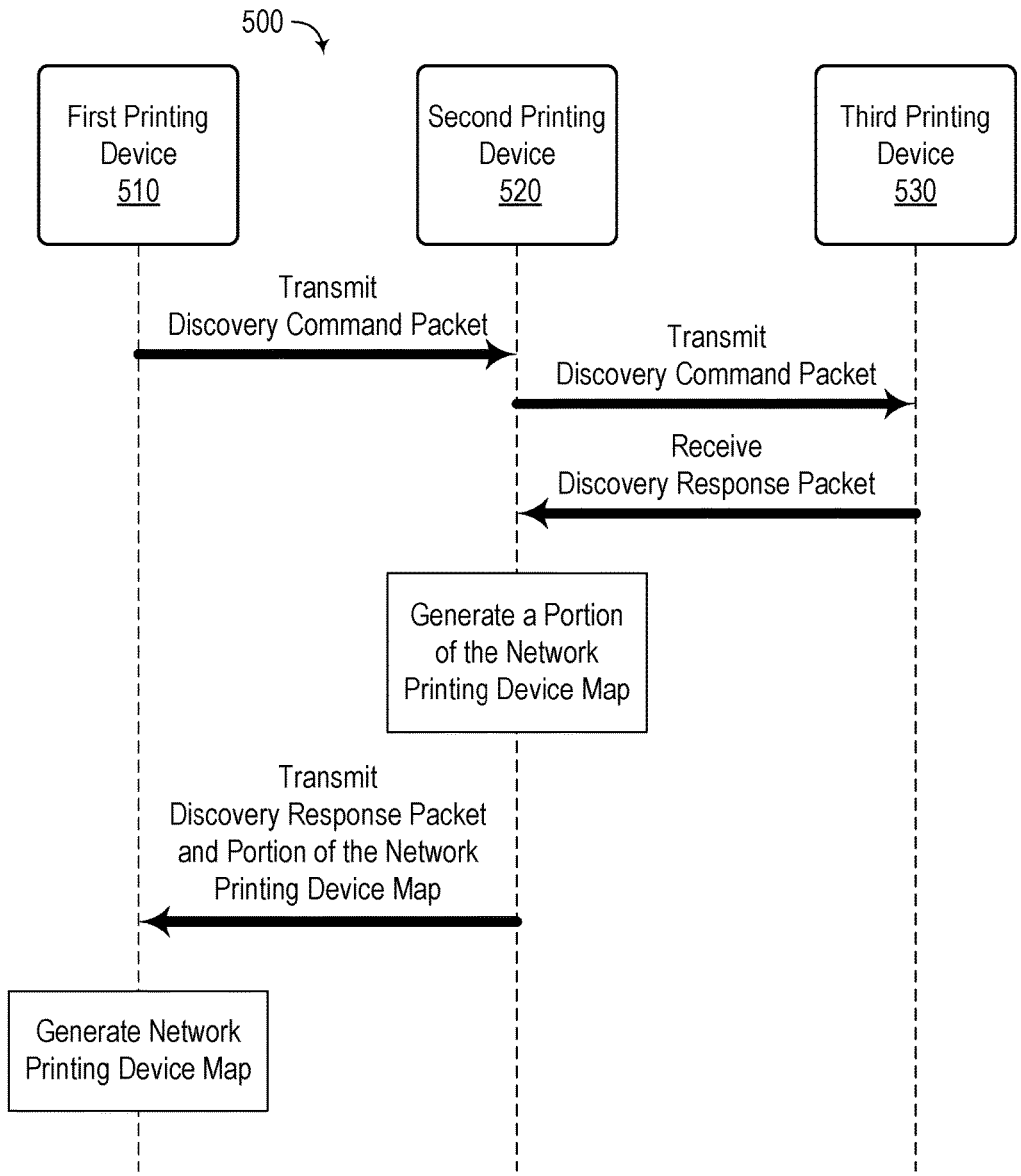
FIG. 5 is a data flow diagram illustrating a method, according to an example embodiment.

FIG. 5 is a data flow diagram 500 illustrating a method, according to an example embodiment. The data flow diagram 500 depicts information passing among first printing device 510, second printing device 520, and third printing device 530. More specifically, the data flow diagram 500 depicts a process through which a network topology is determined and a network printing device map is generated. Note that the data flow diagram 500 merely depicts an example of data flow among three example printing devices in the system; in various implementations, fewer or additional printing devices may be present and fewer or additional steps may be performed different from those depicted in FIG. 5 to accomplish the printer firmware updating and installation disclosed in the present application.

First, the first printing device 510 transmits a discovery command packet to the second printing device 520. The discovery command packet may be data that instructs the printing device to transmit discovery command packets to other printing devices that it is connected to. In some implementations, the discovery command packet may contain information about the first printing device 510, including the network settings (e.g. IP address, among other kinds of network information) of the first printing device. The second printing device 520 may use such network information when transmitting response information back to the first printing device 510.

Then, the second printing device 520 transmits a discovery command packet to the third printing device 530. In some instances, the third printing device 530 may be considered a "neighboring" printing device to the second printing device 520. For the purposes described herein, a "neighboring" printing device may be any networked printing device accessible by a particular printing device. Neighboring printing devices may or may not be within close physical proximity to each other. Generally, when performing network device discovery of the present application, devices may perform a recursive "call-and-response" operation, whereby a device receives a discovery response packet from a requesting device, responsively sends out discovery response packets to neighboring devices, receives responses from those neighboring devices, and then sends a collective response to the requesting device.

In the method illustrated by data flow diagram 500, the third printing device 530 receives the discovery command packet. Then, the third printing device 530 may determine whether or not there are any additional neighboring devices that have not yet received a discovery command packet. In some implementations, when a device receives a discovery command packet, that device is digitally "flagged" or otherwise marked to indicate that the device has already received a discovery command packet and thus has begun performing the network device discovery process. In the example shown in FIG. 5, the third printing device may determine whether neighboring devices have begun the network device discovery process by checking for such a digital flag or mark.

Then, the third printing device 530 transmits a discovery response packet to the second printing device 520. The discovery response packet may contain any combination of information about the third printing device's configuration, capabilities, network settings, and/or status, among other kinds of information.

Then, the second printing device 520 generates a portion of the network printing device map. In this simplified example, the third printing device 530 is not connected to any other neighboring devices, such that the discovery response packet it sent back to the second printing device 520 contained only information about the third printing device 530. In generating the portion of the network printing device map, the second printing device 520 may determine the logical connection between the second printing device 520 and the third printing device 530, and may generate data representative of that logical connection.

In other examples, this step may involve receiving logical connection information of a smaller portion of the network topology. In these cases, a printing device may "tack" on or otherwise include that printing device within the logical connection information to "grow" the network topology. In some instances, multiple portions of the network topology may be provided in responses to a given printing device, and the given printing device may determine a manner in which to logically combine the connections of the multiple portions of the network topology in order to form a combined network topology. Such a process of combining portions of a network topology may be repeated until the device that initiated the network discovery process combines all sub-topologies to form the entire network topology.

Then, the second printing device 520 transmits the discovery response packet and the portion of the network printing device map to the first printing device 510. As described above, the second printing device 520 may transmit information about the logical connection between the second printing device 520 and the third printing device 530. In some implementations, the second printing device 520 may also transmit a discovery response packet to the first printing device 510. In other implementations, the second printing device 520 may include information that would otherwise be transmitted as a discovery response packet into the portion of the network printing device map.

Then, the first printing device 510 generates the network printing device map. This may involve determining a manner in which to combine multiple received network printing device maps and/or portions of the network topology. In this example, the first printing device 510 may determine the logical connection between the first printing device 510 and the second printing device 520, and then subsequently add into the received portion of the network printing device map information about that determined logical connection to form a complete network printing device map.

Note that certain steps depicted in FIG. 5 may be omitted and/or other steps may be added, depending on the particular embodiment. In some implementations, some steps may be performed in parallel. Furthermore, although transmission single discovery command packets to only one printing device at a time is depicted, a given printing device may transmit multiple discovery command packets to multiple printing devices. The transmission and/or reception of information may be blocking or non-blocking, depending upon the particular implementation.

V. Example User Interfaces

FIGS. 6A-6F are example user interfaces for redirecting a print job, according to an example embodiment. The example user interfaces include example depictions of network printing device maps. The user interfaces and network printing device maps illustrated in FIGS. 6A-6F may be generated using the network topology generation techniques and operations of the present application. It should be understood that the graphical representations of print jobs, printing devices, routers, connections, informational pop-up boxes, and/or pop-up menus are merely example graphical representations provided as an explanatory aid. The particular graphical objects, layout, options, and other user interface elements may differ from those depicted in FIGS. 6A-6F, depending upon the particular implementation.

Figure 6A:
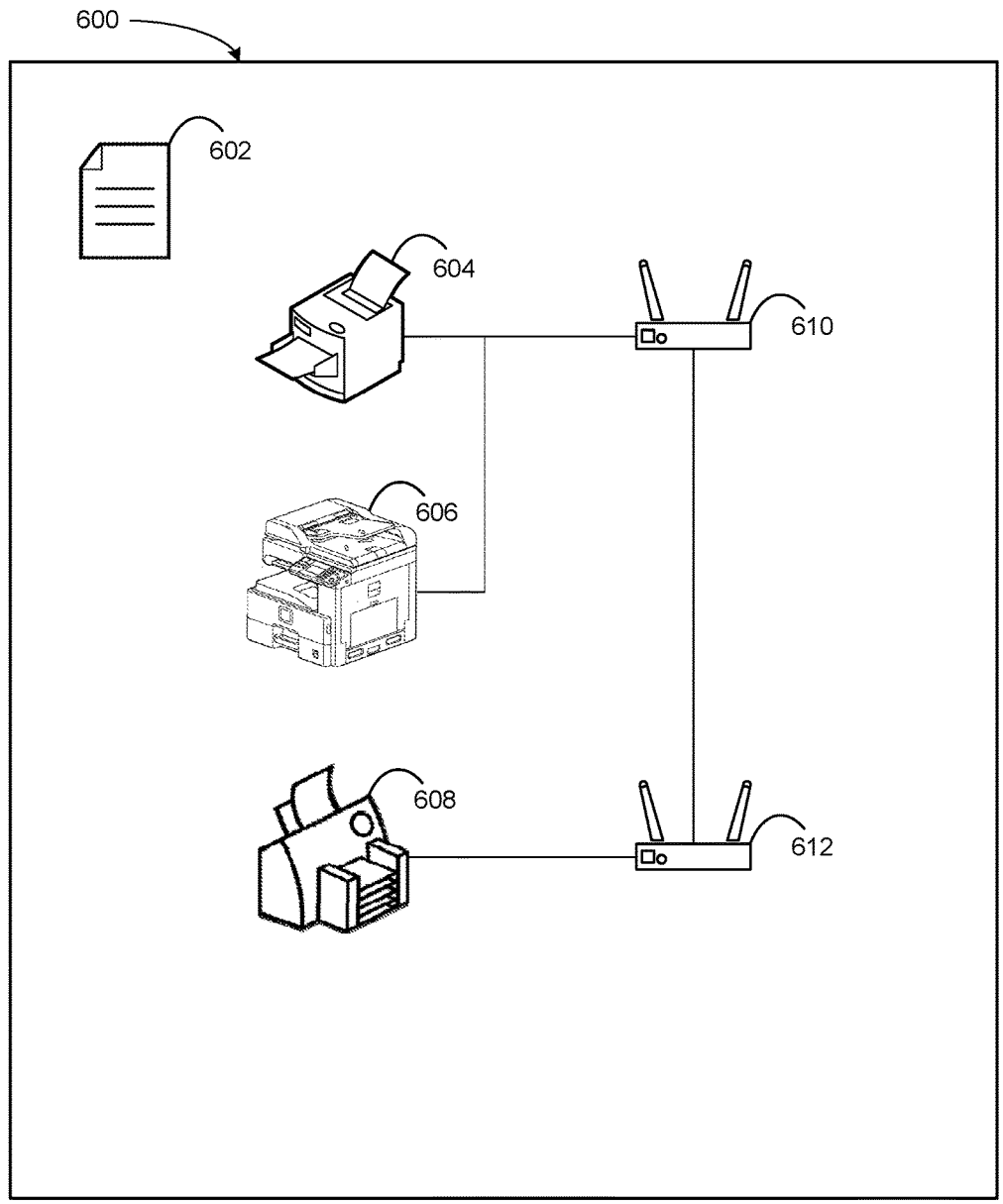
FIGS. 6A-6F are example user interfaces for redirecting a print job, according to an example embodiment.

FIG. 6A illustrates an example user interface 600 that includes a printing device network map and a graphical object representative of the print job 602 (hereinafter referred to as "print job 602"). The printing device network map is a graphical representation of a network topology, and includes graphical objects representative of printing devices 604, 606, and 608 and routers 610 and 612. In this example (as well as for the example user interfaces depicted in FIGS. 6B-6F), the printing devices 604 and 606 are both within the same subnet provided by router 610, while the printing device 608 is within a different subnet provided by router 612. Routers 610 and 612 are communicatively connected to each other. Thus, in order for data to be transmitted from one of the printing devices 604 and 606 to printing device 608, it must first be sent to router 610, which forwards the data onto router 612, which in turn provides that data to printing device 608. Collectively, the routers 610 and 612, along with the printing devices connected thereto, constitute the local network represented by the network printing device map. As discussed to herein, the "network printing device map" refers to the graphical representation of the "network topology", which is an informational (i.e. based on data) representation of the layout of the local network.

The printing devices and routers shown in the network printing device map are depicted as graphical images representative of those printing devices and routers. Those graphical images may be selected by the printing device or computing device providing the print job redirection user interface for a variety of reasons. In some instances, the graphical images may be selected to reflect the actual physical appearance of the printing device (e.g. size, shape, form factor, or the placement of various components of that printing device). The graphical images may also be selected on the basis of each printing device's capabilities (e.g. where an MFP may be depicted similarly to printing device 606, or a single-function printing device may be depicted similarly to the printing device 604). Various graphical images or objects may be selected to represent a given printing device for other reasons as well.

Figure 6B:
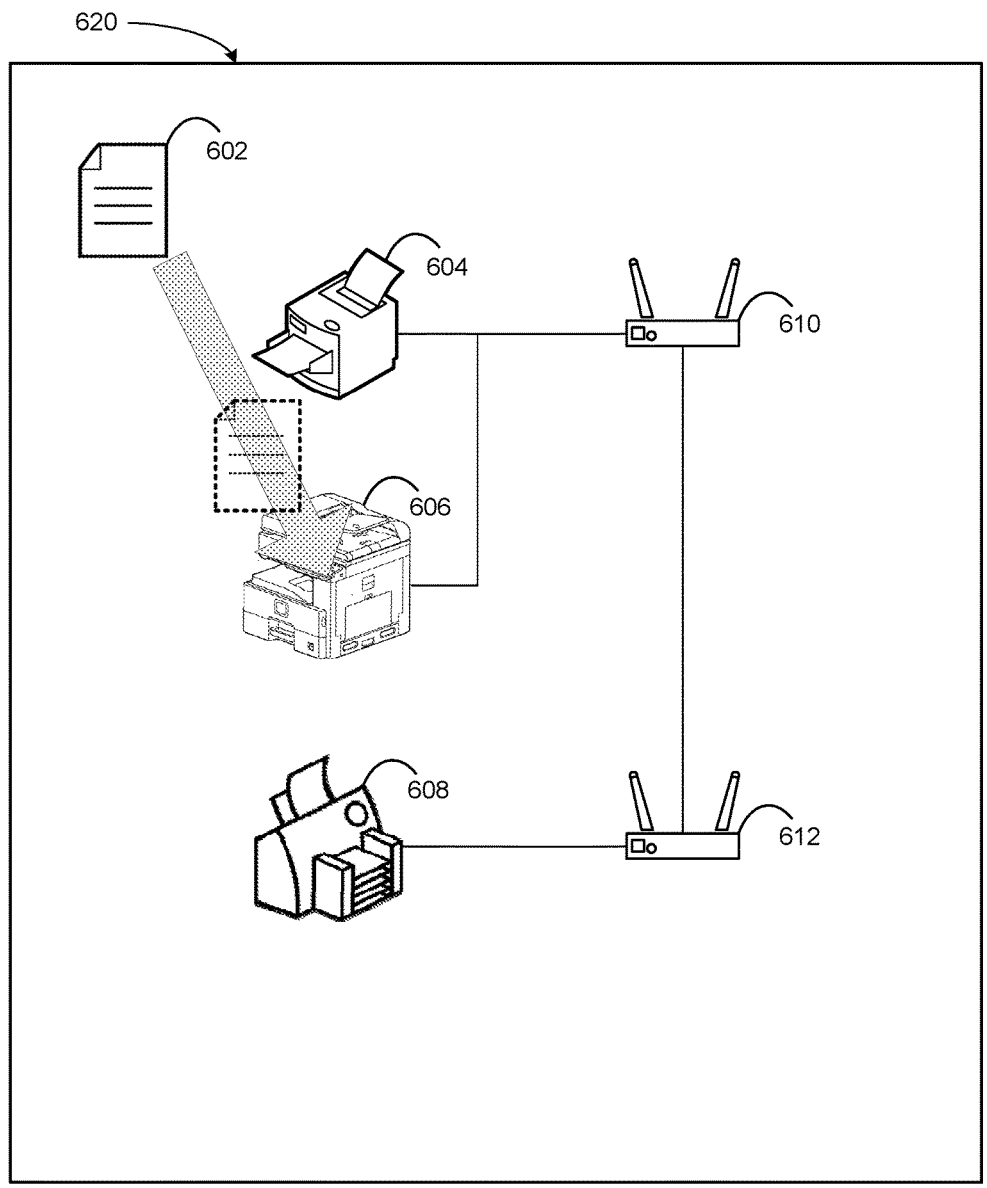

FIG. 6B illustrates a drag-and-drop operation being performed on example user interface 620. In this example, the shaded arrow represents a direction along with the dragging portion of the drag-and-drop input gesture was performed. The dotted-lined print job represents that the drag-and-drop input gesture was initiated by an initial tap or click on the print job 602. Note that the shaded arrow and dotted-lined print job are shown for explanatory purposes, and may or may not be displayed on some implemented print job redirection user interfaces.

The example drag-and-drop operation shown in FIG. 6B shows the print job 602 being dragged from its initial position onto the printing device 606. This input gesture indicates that printing device 606 is selected as the printing device to which the print job is to be redirected. In one example, the printing device 604 might have been the initial printing device at which a user requested to execute a print job. However, if that printing device 604 was unable to carry out the print job, the user interface 600 may be displayed to allow a user to select an alternative printing device to execute the print job. In example shown in FIG. 6B, the user selects printing device 606 as the printing device to redirect the print job. In response, the printing device 604 may be instructed to transmit the print job to printing device 606.

In embodiments where the user interface 620 is implemented on a touchscreen, the drag-and-drop input gesture may first involve a user placing a finger, stylus, or other pointing apparatus onto the print job 602. Without lifting the finger, stylus, or other pointing device, the user may drag the print job 602 onto the printing device 606, at which point the user may then lift or release the finger, stylus or pointing device to complete the drag-and-drop operation. In embodiments where the user interface 620 is implemented on a display with a separate operable pointing device—such as a mouse—the drag-and-drop input gesture may involve placing a cursor or other positioning indicator over the print job 602, depressing and holding down a button on the mouse, moving the cursor or other positioning indicator onto the printing device 606, and then releasing the depressed button.

Figure 6C:
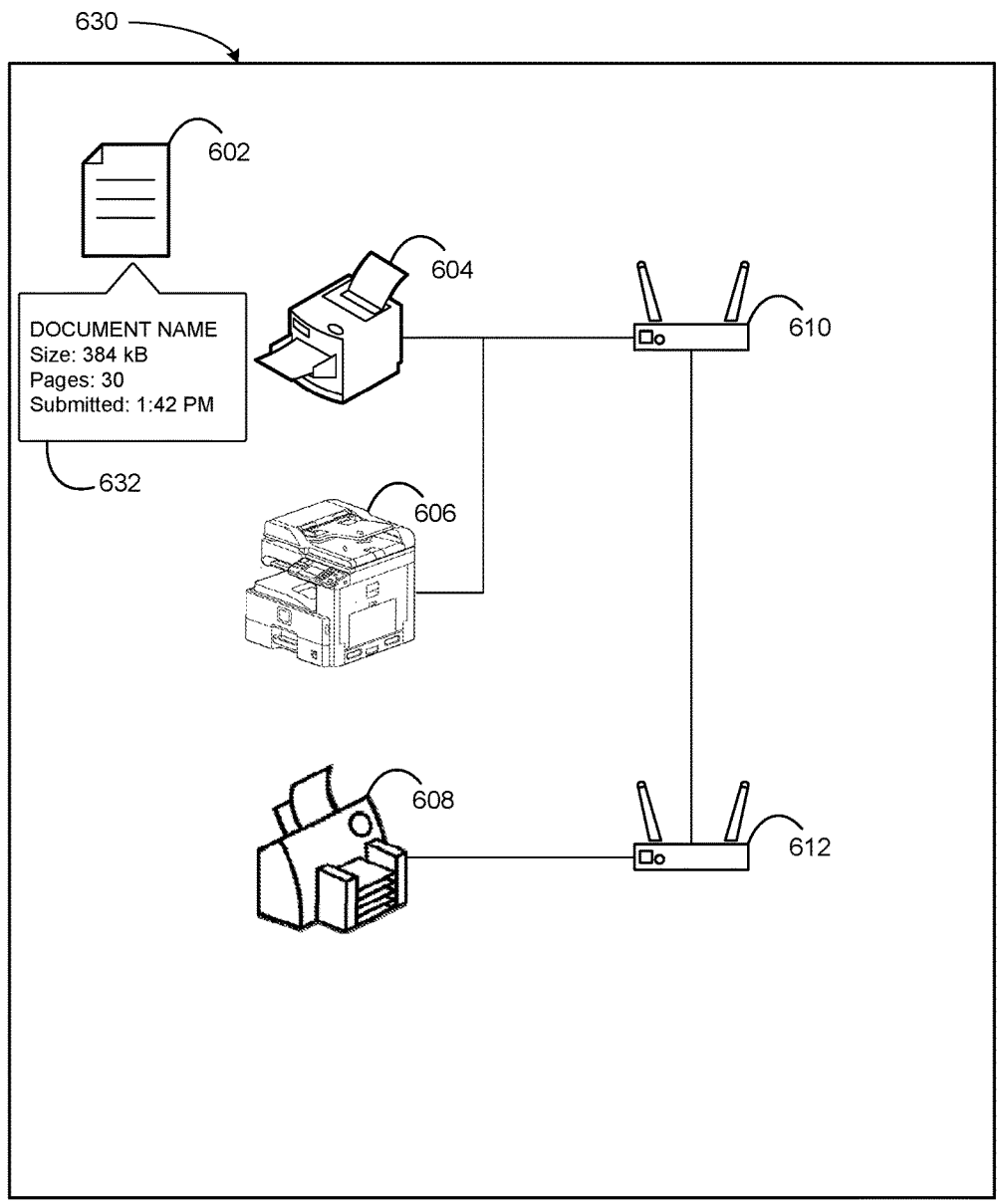

FIG. 6C illustrates an informational pop-up box 632 associated with the print job 602 on the example user interface 630. The pop-up box may be displayed in response to receiving a click- or tap-and-hold input gesture on the print job 602. The pop-up box 632 may display information about the print job 602, including the name of the document or file used in generating the print job 602, the data size of the print job 602, the number of pages of the print job 602, and/or the time at which the print job 602 was originally requested to be executed. In some implementations, the pop-up box 632 may be displayed in response to other gestures, such as a double clicking or double tapping of the print job 602.

Figure 6D:
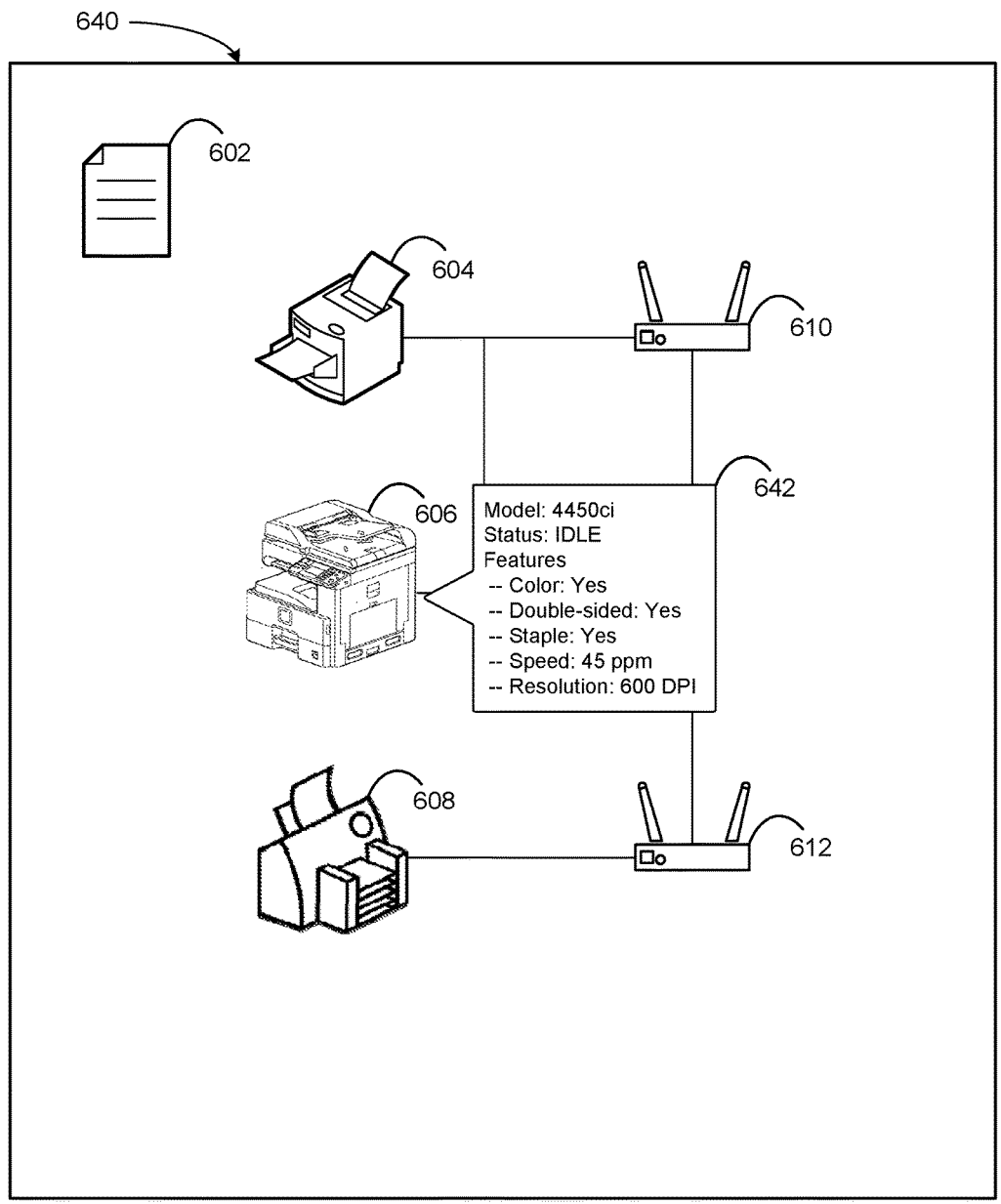

FIG. 6D illustrates an informational pop-up box 642 associated with the printing device 606 on the example user interface 640. The pop-up box 642 may be displayed in response to receiving a double tap or double click input gesture on the printing device 606. The pop-up box 642 may display information about the printing device 606, such as its model number, its status, and/or various features or capabilities of the printing device 606 (e.g. whether or not printing device 606 can perform color printing, double-sided printing, stapling, the speed at which the printing device 606 can print, and/or the maximum resolution at which the printing device 606 can print, among other possible features or capabilities). In some implementations, the pop-up box 642 may be displayed in response to other gestures, such as a click- or tap-and-hold input gesture.

Figure 6E:
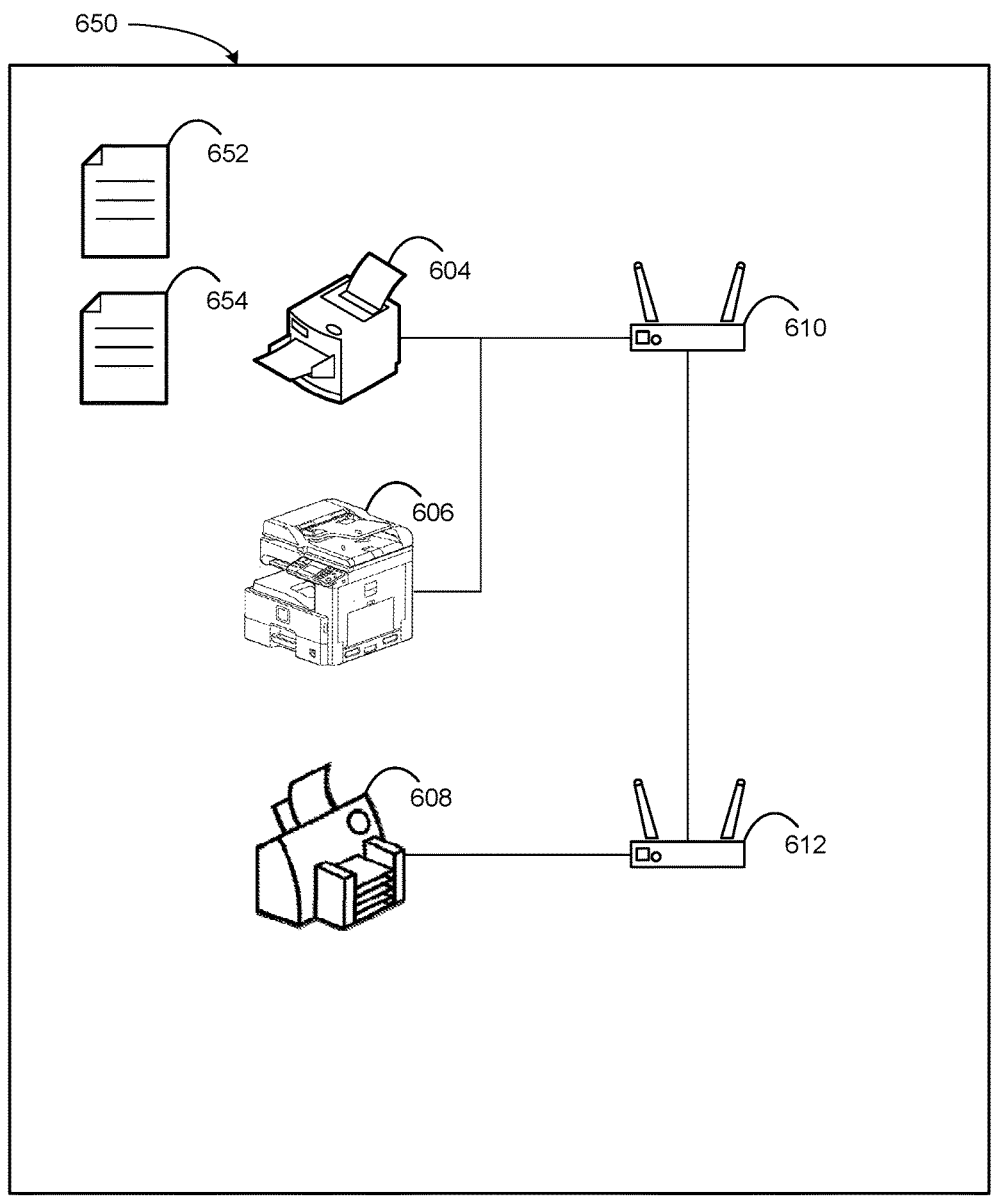

FIG. 6E illustrates an example user interface 650 with a split print job that includes a first portion 652 of a print job and a second portion 654 of a print job. The first portion 652 and second portion 654 may collectively form the print job 602. In some instances, a user may split a particular print job into two or more separate print jobs (i.e. sub-jobs) for execution on two or more printing devices. This may be desirable if, for example, the original print job contains a large number of pages that would take a considerable amount of time to be completed on a single printing device. In these circumstances, certain split portions of the print job may be unsuccessfully carried out, and thus require redirection to be carried out on an alternative printing device. In some cases, every split portion may have failed to be executed on their respective printing devices, and thus each require redirection. In such examples, two or more split portions of the print job may be displayed on the user interface.

In the example shown in FIG. 6E, a user may be presented with multiple split portions of a print job. The user may perform multiple input gestures to redirect those split portions to one or more printing devices. In some instances, a user may choose to execute both the first portion 652 and the second portion 654 on a single printing device. In other instances, the user may choose to redirect the first portion 652 to one printing device, and the second portion 654 to another printing device. It should be understood that a print job may be split into any number of portions, any of which may fail to be executed, at which point a user may be presented with the failed portions of the print job which can be redirected in a variety of ways.

In some cases, a user may select a first alternative printing device at which to redirect the first portion 652, and a second alternative printing device at which to redirect the second portion 654. In other words, the split portions may each be redirected to alternative printing devices. In some scenarios, however, a user may wish to execute printing of one of the first portion 652 and the second portion 654 on the originally-selected printing device. This may be the case when, for example, the error at the originally-selected printing device that caused the print job to initially fail is fixed (e.g. a simple paper jam where the user can easily fix the error, such that the printing device may resume operation). When the user splits the print job into first portion 652 and second portion 654, the user may wish to execute printing of at least one of those portions on the originally-selected printing device. In these circumstances, the print job redirect user interface may permit a user to cause execution of printing of the first portion 652 and/or the second portion 654 on the originally-selected printing device. This may be achieved by a user performing a click-and-drop or drag-and-drop operation of one of the split portions onto the originally-selected printing device.

Figure 6F:
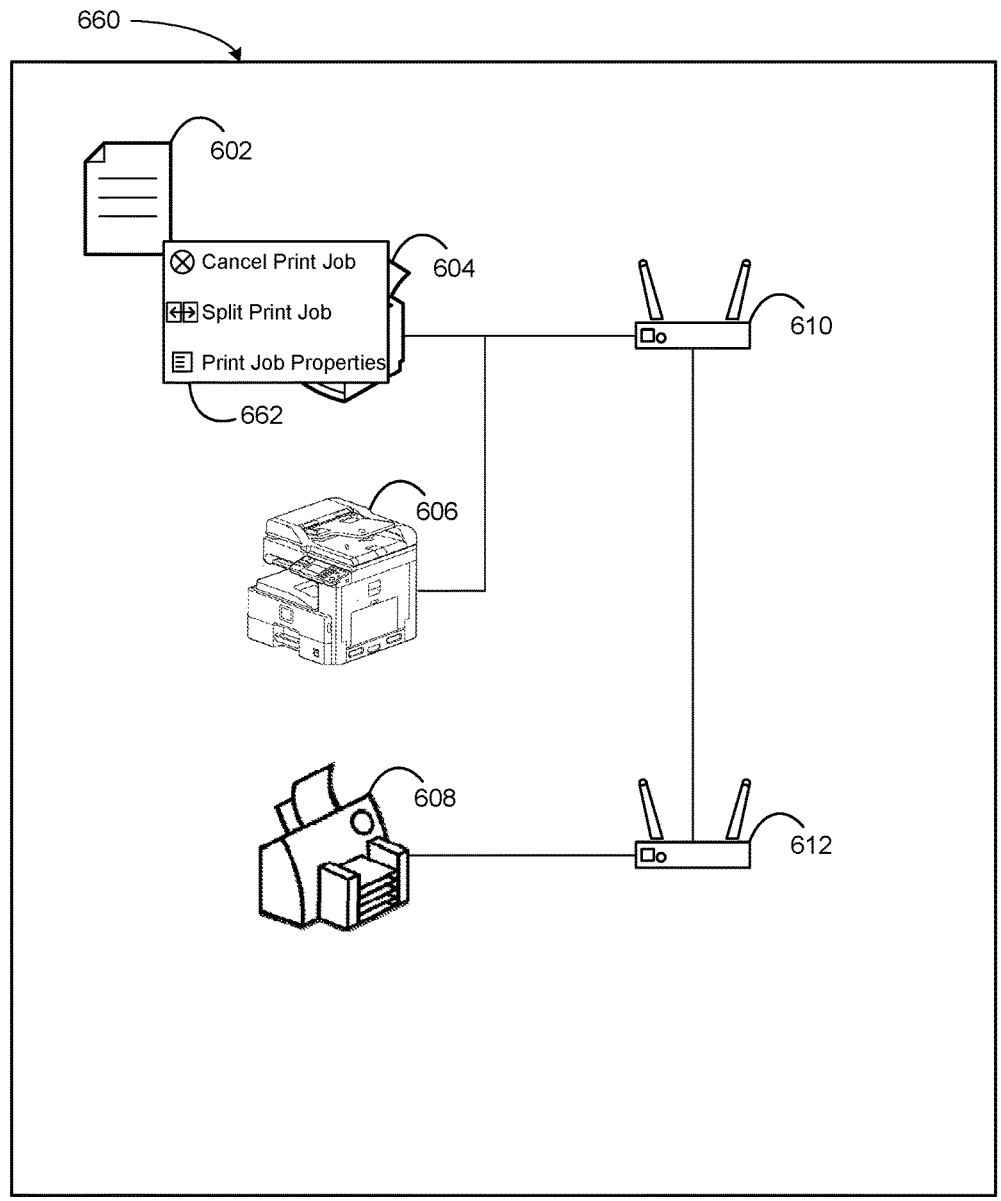

FIG. 6F illustrates an operation dialog pop-up 662 associated with the print job 602 of an example user interface 660. The operation dialog pop-up 662 provides multiple selectable operations that can be carried out. In the example shown in FIG. 6F, the dialog pop-up 662 includes the option to cancel the print job 602, split the print job 602, or to display print job properties. If the "Cancel Print Job" option is selected by the user, the print job 602 may be deleted from the printing device and any pending operations associated with the print job 602 may be terminated. If the "Split Print Job" option is selected by the user, a print job split dialog may be displayed requesting a user to configure the manner in which to split the print job. An example print job split dialog is illustrated in FIG. 7, which is described below in more detail. After splitting the print job, the user interface 660 may display two or more print job icons or graphical objects representative of the multiple split portions of the print job 602. If the "Print Job Properties" is selected, a pop-up box (such as pop-up box 632 shown in FIG. 6C) including information about the print job may be displayed.

It should be understood that any number of alternative operations may be provided within an operation dialog pop-up, presented in a variety of orders and paired with any kind of graphical icon (or not paired with any graphical icon). The operation dialog pop-up 662 may be displayed in response to an input gesture, such as a tap- or click-and-hold, double tap or double click, or any other kind of input gesture, depending upon the particular implementation.

The user interfaces illustrated in FIGS. 6A-6F are example user interfaces depicting various operational aspects of a user interface for print job redirection. User interfaces similar to those shown in FIGS. 6A-6F may be provided on an operation panel of a printing device, such as printing device 606. In some embodiments, user interfaces similar to those shown in FIGS. 6A-6F may be provided on a computing device, such as a client device or mobile computing device. Regardless of the device on which the print job redirection user interface and network printing device map is provided, it should be understood that such a user interface provides a means for redirecting a print job, as well as graphically provide information to a user to assist them in determining a printing device at which to redirect the print job, provide a means to the user for configuring the print job, and permit a user to perform additional operations (e.g. canceling the print job or splitting the print job, among other operations).

FIG. 7 is a graphical representation of a print job split dialog 700, according to an example embodiment. The print job split dialog 700 may be displayed in response to a user selecting an option from a pop-up box and/or invoked as a result of performance of a certain input gesture on the print job redirection user interface. In the example print job split dialog 700 shown in FIG. 7, the manner in which a print job may be split can be configured. For example, a user may split a print job into multiple portions, where each portion has a certain number of pages per split portion. As another example, a user may wish to print multiple copies of a particular print job. The print job split dialog 700 may permit a user to configure a print job split. A variety of other parameters may be configured that change the manner in which a split print job is performed, such as selecting a certain page or pages at which to split the print job or selecting a number of split portions to generate, among other possible configurable parameters.

In some implementations, the print job split dialog 700 may provide other options for splitting a print job. For instance, a print job may be split based on an entered or selected percentage value. As one example, a user may choose to split one print job into two print jobs at 40% (such that one split portion represents the first 40% of the original print job, and the other split portion represents the remaining 60% of the original split job). In some implementations, the print job split dialog 700 may permit entry of two or more split percentages; for example, a 15%-55%-30% split may result in a first split portion representing the first 15% of the original print job, a second split portion representing the next 55% of that print job, and a third split portion representing the remaining 30% of that split print job. In yet another example, a user may specify a percentage value that represents the size for each portion (e.g. specifying 25% may split the print job into four print jobs, each representing a separate fourth of the original print job). Regardless of the particular implementation, the print job split dialog 700 may permit a user to specify one or more percentage values when configuring the manner in which to split a print job.

In some embodiments, a print job may be split automatically without additional user interaction or configuration. In some cases, a print job may be split based on default settings; for example, if a print job exceeds a threshold number of pages, that print job may be split automatically into multiple portions to prevent a single printing device from carrying out a large print job. This may be desirable to prevent a particular printing device from being used to solely execute one print job for a long period of time, thus preventing other users from executing their print jobs.

In some implementations, each printing device may individually specify a maximum print job size (e.g. a maximum number of pages per print job, a maximum data size per print job, etc.). If a printing device receives a print job for execution which exceeds that printing device's maximum print job size, the printing device may automatically split the print job and redirect one or more resulting split portions to other printing devices. The printing device may display a print job redirect user interface, informing the user that the original print job exceeded the maximum print job size, and request that the user configure the manner in which to split the print job and/or request that the user redirect any resulting split portions of the original print job. In some instances, the printing device may automatically perform the splitting of the print job, and provide the print job redirect user interface to permit a user to select the printing devices at which to perform each of the resulting split portions.

In some embodiments, a print job may be associated with a user. A print job may be split based on that user's stored preferences. For example, a user may have set that user's preferences to indicate a maximum time in which to complete execution of a print job. During operation, a printing device may first receive the print job and estimate the amount of time it would take to execute the print job on that printing device. Estimating the printing time may be accomplished by dividing the number of pages in the print job by the printing speed (in pages-per-minute) (e.g. a 100-page print job on a printing device capable of 50 ppm would take approximately 2 minutes to complete).

A user may set that user's preference to have that user's print jobs complete in under a specified amount of time. As one example, a user may specify a maximum print job time to be 3 minutes. That user may transmit a 200-page print job to a printing device capable of printing at a speed of 40 ppm. That printing device may estimate the print job, if performed only on that printing device, would take approximately 5 minutes to complete. Upon determining that the estimated printing time of 5 minutes exceeds the user-specified maximum of 3 minutes, the printing device may split the print job automatically or request that the user designate a manner in which to split the print job. If split automatically, the printing device may generate two split portions: a first portion containing 120 pages of the original print job (which would complete in 3 minutes at the original printing device) and a second portion containing the remaining 80 pages of the print job. The user may then, at the print job redirect user interface, select another printing device at which to perform the second portion containing the remaining 80 pages of the print job. The print job redirect user interface displays the estimated print job time for that second portion for each of the printing devices on the print job redirect user interface, and display those estimated times on or near each of the printing devices. Once the user selects an alternative printing device, the printing device redirects that second portion to the selected alternative printing device. The second printing device may execute the second portion in parallel with the printing of the first portion at the original printing device, so that the print job is collectively completed within the user-specified 3-minute time period.

VI. Variations

A printing device may "fail" to execute a print job for a variety of reasons. In addition to the above-described instances where a "failure" has occurred, a printing device may fail to execute a print job due to corruption of print job data. Such data corruption may be a result of a loss of data from a faulty transmission, or may be caused by a electrical malfunction (e.g. an electrical short in the memory, overheating of a memory device, etc.). As another example, a printing device may lose power or be otherwise shut down while the print job is being performed (e.g. due to the printing device being unplugged, if the power grid to which the printing device is connected loses power, from a power supply malfunction). In some circumstances, a print job failure may be detected if the printing device goes offline or otherwise does not notify the computing device that requested execution of the print job that the print job completed; in those circumstances, a "notification" of a failure may be a detection of a disconnection of the printing device. For the purposes of the present application, a "failure" to execute a print job may be an occurrence of any event that prevents the completion of the print job.

The discovery response packets may include a variety of different kinds of information therein. In addition to the above-described example information that may be incorporated within a discovery response packet, a given response discovery packet may include various operational information about a printing device. Information about the printing device's manufacturer, model, serial number, and any other kinds of printing device identification information may be included. Additionally, status information—including whether the printing device is busy or available, a number of queued or spooled print jobs, any errors currently affecting the printing device's operation, and/or the levels of various printing supplies (e.g. ink, toner, paper, etc.)—about the printing device's operational status may be included within the discovery response packet.

In addition to the input gesture examples described above, other gestures may be implemented. In embodiments where an operation panel includes a touchscreen, an input gesture may be combination of taps, holds, dragging, repetitive tapping, and possibly gestures using two or more fingers. More specifically, certain input gestures may involve dragging or swiping one or more fingers along a path to approximately "draw" a certain shape or symbol.

In embodiments where an operation panel includes a pointing device (such as a mouse, touchpad, trackpad, trackball, or joystick), input gestures may involve a combination of spatial manipulation of that pointing device (e.g. dragging, tilting, spinning, or applying pressure in various directions) and operating one or more buttons of that pointing device. For example, a drag-and-drop operation may involve depressing a button on a pointing device, spatially manipulating that pointing device, then releasing that button. Various input gestures may be implemented involving any combination of movements and button operations.

In some implementations, a network printing device map may modify the appearance of one or printing devices based upon the status of those printing devices. For example, when generating the network topology, a discovery response packet for a particular printing device may include status information indicating that the particular printing device is unavailable. For instance, that printing device might require servicing before continuing operation. In this example, the graphical object representative of that particular printing device may be modified to visually show that it is unavailable. As one example, the printing device graphic may appear shaded or "grayed out," such that a user could easily recognize that the grayed out printing device is unavailable and is unable to execute a redirected print job.

In some instances, a computing device requesting execution of a print job may specify certain print job settings with which to execute the print job. These print job settings may specify, for example, whether to perform color printing or black and white printing, single-sided printing or double-sided printing, margin settings, whether or not to staple the pages, the manner in which to staple pages, whether or not to hole-punch the pages, a specific paper size, as well as any other kind of printing or other finishing settings. If execution of the print job fails at a first printing device, a user may wish to redirect the print job to a different printing device while still maintaining the originally-specified print job settings. However, certain print job settings may only be capable on some of the printing devices in the network. For instance, certain printing devices may only be capable of printing in black and white, even though the originally-specified print job settings designate color printing.

In these circumstances, a computing device providing a print job redirection user interface may, based on the originally-specified print job settings, modify or otherwise alter the user interface to visually indicate to the user which printing device or devices are capable of executing the print job with the originally-specified print job settings. For instance, if the print job settings indicate that two-sided printing was set, the computing device may modify the user interface to visually inform the user which printing devices are capable of duplex printing (i.e. are capable of carrying out the print job with the originally-specified two-sided printing).

In some implementations, modifying the print job redirection user interface may involve modifying visual aspects of the graphical objects that represent printing devices capable of executing the print job with the originally-specified print job settings. With respect to the two-sided printing example above, the icon or image used to represent a printing device capable of duplex printing may be enlarged, its color might be changed to a certain predetermined color (e.g. may be tinted or otherwise colored green, as one example), its color may be modified (e.g. brightened), it may alternate between two or more colors periodically, the icon or image may flash, the icon or image may be outlined, and/or any other kind of graphical modification. It should be understood that any kind of visual modification may be made to graphical objects representative of printing devices capable of preserving the print job settings.

In some implementations, printing devices that are not capable of executing the print job using those print job settings may be represented differently to the user than the printing devices that can preserve those print job settings. With respect to the two-sided printing example above, the icon or image used to represent printing devices incapable of executing the print job with the originally-specified print job settings may be grayed out, dimmer, have its color changed to a certain predetermined color (e.g. may be tinted or otherwise colored red, as one example), or may have a shape or other graphic overlaid on top of the printing device (e.g. a "X", as one example), and/or any other kind of graphical modification. Regardless of the particular visual modification techniques employed, the print job redirect user interface may visually distinguish between printing devices that are capable of preserving the print job settings from the printing devices incapable of executing the print job using those print job settings using any combination of the above-described techniques.

In some embodiments, the print job redirect user interface may display a partial network printing device map that contains one or more printing devices capable of executing the print job with the originally-specified print job settings, while omitting one or more printing devices that are incapable of preserving the originally-specified print job settings. In this manner, the number of printing devices shown in the print job redirect user interface may be reduced.

Some embodiments may require a user to be authenticated or authorized before permitting redirection of that print job. In instances where the print job redirection user interface is provided on an operation panel of a printing device, the printing device may request a user to verify the user's identity before allowing the print job to be redirected. Such authorization, authentication, or verification may involve requesting a user to enter login credentials (e.g. a username and password), enter in a keycode or PIN, swipe or scan a keycard, scan that user's fingerprint, and/or verify the user with facial recognition, among other forms of authentication. User authentication, authorization, and/or verification may be desired to prevent other users from redirecting a print job without permission from the user requesting the print job and/or to protect that user's document if, for example, it contains sensitive information. After a user is authorized, authenticated, and/or verified, that user may then be presented with the print job redirection user interface on an operation panel of the printing device.

In instances where the print job redirection user interface is provided on a client device or mobile computing device separate from the printing device, the user may also be requested to be authorized, authenticated, and/or verified in a similar manner to that described above.

In some cases, a user may only be authorized to print on certain printing devices. If a user attempts to redirect a print job to a printing device that the user is unauthorized to print with, the print job redirection user interface may display a message to the user informing the user that the user is not authorized to carry out the print job on the selected printing device and requesting the user to select a different printing device.

If a user redirects a print job from a first printing device to a second printing device, and the second printing device also fails to execute the print job, the print job redirection interface may prompt the user to select a third printing device to carry out the print job. In some cases, the print job redirection interface may display a message informing the user of the second failure and requesting selection of a different printing device.

In embodiments with user authentication, authorization, and/or verification, the print job redirection user interface may modify the network printing device map on the basis of that user's printing device usage history. For example, the graphical objects may be shaded, highlighted, colored, or otherwise modified to indicate which printing devices the user has previously and/or frequently used to execute print jobs. When an authenticated user executes a print job, that information may be logged or stored on a server or other computing device. Collectively, such stored information may constitute the user's printing device history. In some instances, the manner in which the printing devices are arranged may be modified to reflect the user's printing device history. As one example, the printing devices most frequently used by the user may be placed towards the top of the network printing device map.

In some instances, a user may submit two or more print jobs for execution on a printing device. If an error occurs on the printing device before all print jobs are completed, the user may be prompted to redirect the remaining print jobs that were not completed (including partially completed print jobs and/or print jobs that did not even begin) to one or more alternative printing devices. In some cases, the user may redirect all remaining uncompleted print jobs to a single printing device. In other cases, the user may wish to redirect each print job individually. Furthermore, a user may wish to split one or more of the remaining print jobs. The print job redirect user interface may enable a user to redirect the remaining uncompleted print jobs in a variety of ways, such as those discussed within the present application.

In some implementations, when a user selects a print job or a printing device on the print job redirect user interface (e.g. by tapping or clicking on the graphical object representative of that print job or printing device), that print job or printing device may be highlighted, colored, outlined, or otherwise visually modified to represent that it has been selected. For example, the color of the selected print job or printing device may be brightened, the selected print job or printing device may be "flashing" (by periodically alternating between two colors, as one example), and/or the size of the graphic representing the selected print job or printing device may be increased in size, among other possible visual modifications. Conversely, the printing devices and/or print jobs (or split portions of a print job) that are not selected may be visually distinguishable from the selected printing device or print job by being comparatively darker, not flashing, and/or smaller in size. Regardless of the particular implementation, a selected printing device and/or print job may be visually distinguished from the other non-selected printing devices and/or print jobs.

In some instances, a user may be prompted by the print job redirect user interface to change a print job setting before redirecting the print job. In some circumstances, a user may specify print job settings that can only be carried out by the originally-designated printing device within the network. As one example, a user may originally set a print job to be executed in color on the only color-capable printing device within the network, such that there is no alternative printing device capable of carrying out the print job in color. In such circumstances, the print job redirect user interface may request a user to modify the print job settings (e.g. to change the print job settings from color to monochrome). In some implementations, the print job redirect user interface may suggest print job setting modifications or alterations and request that the user to permit such a modification or alteration. For example, if the printing device determines that no other printing devices within the network can print in color, the printing device may prompt the user with a suggestion to modify the print job from color to monochrome so that it is compatible with other printing devices for redirection.

When a user attempts to redirect a print job having one or more print job settings that are incompatible with the selected alternative printing device, the print job redirect user interface may prompt the user to request confirmation that one or more print job settings are modified or ignored upon redirection. For example, a print job may have print job settings that specify two-sided printing with stapling. If the user redirects that print job to a printing device with duplex capabilities but not stapling capabilities, the print job redirect user interface may inform the user that the selected printing device cannot preserve the stapling setting and request that the user confirm the redirection despite the loss of this setting.

In various embodiments, when a user invokes an informational pop-up box that indicates a printing device's capabilities, the print job redirect user interface may visually identify which of those printing device's capabilities are compatible with the print job settings of the print job to be redirected. For example, if the print job settings specify two-sided printing, a line of text within the informational pop-up box may be modified (e.g. made bold, be of a larger font, colored green, etc.) to indicate that the printing device is capable of preserving that particular print job setting (e.g. "duplex printing" might be bold, colored, or enlarged to indicate that the printing device can preserve the two-sided print job setting). If the printing device associated with the pop-up box is incapable of preserving a print job setting, the line of text within the informational pop-up box for that incompatible setting may be modified (e.g. strikethrough, smaller font, colored red, etc.) to indicate that the printing device is incapable of preserving that particular print job setting (e.g. "simplex printing" might be modified to show that the printing device cannot perform two-sided printing).

VII. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
receiving a notification indicating that execution of a print job at a first printing device failed;
in response to receiving the notification, displaying a network printing device map on a display unit, wherein the network printing device map is a graphical representation of a network topology of a plurality of printing devices within a local network;
receiving an input gesture comprising a drag-and-drop operation indicative of a selection of a second printing device of the plurality of printing devices with which to execute the print job, whereby a first graphical object representative of the print job is placed onto a second graphical object representative of the second printing device; and
upon receiving the input gesture, causing the first printing device to transmit the print job to the second printing device.

2. The method of claim 1, further comprising:
causing the first printing device to transmit discovery command packets to one or more printing devices of the plurality of printing devices;
receiving, from the one or more printing devices, discovery response packets that each represent portions of the network topology of the plurality of printing devices within the local network; and
generating the network printing device map based on the received discovery response packets.

3. The method of claim 1, wherein the input gesture is a first input gesture, and wherein the method further comprises:
receiving a second input gesture indicative of a selection of the second printing device; and
upon receiving the second input gesture, displaying a representation of capabilities of the second printing device.

4. The method of claim 1, wherein the input gesture is a first input gesture, and wherein the method further comprises:
receiving a second input gesture indicative of a selection of a third graphical object representative of the print job; and
upon receiving the second input gesture, displaying a representation of properties of the print job.

5. The method of claim 1, wherein the print job comprises a plurality of pages, wherein the input gesture is a first input gesture, and wherein the method further comprises:
causing the second printing device to execute the print job for a first portion of the plurality of pages;
receiving a second input gesture indicative of a selection of a third printing device of the plurality of printing devices; and
upon receiving the second input gesture, causing the third printing device to execute the print job for a second portion of the plurality of pages.

6. The method of claim 1, wherein the input gesture is a first input gesture, and wherein the method further comprises:
receiving a second input gesture and responsively displaying a print job split dialog, wherein the print job split dialog is a graphical control element that specifies parameters with which to split the print job into two or more sub-jobs;
receiving, from the print job split dialog, a selection of one or more parameters with which to split the print job into the two or more sub-jobs; and
causing two or more printing devices of the plurality of printing devices to execute printing of the respective two or more sub-jobs.

7. The method of claim 1, wherein the display unit is a component of a computing device, and wherein displaying the network printing device map comprises:
transmitting data representative of the network printing device map to the computing device; and
instructing the display unit of the computing device to display the network printing device map.

8. The method of claim 1, wherein displaying the network printing device map comprises:
displaying a plurality of graphical objects representative of the plurality of printing devices, wherein the plurality of graphical objects includes the first graphical object and the second graphical object, wherein the plurality of graphical objects is arranged based on the network topology, and wherein graphical objects associated with unavailable printing devices are grayed out.

9. The method of claim 1, wherein displaying the network printing device map comprises displaying a plurality of graphical objects representative of the plurality of printing devices, wherein the plurality of graphical objects includes the first graphical object and the second graphical object, and wherein the method further comprises:
determining, for each printing device of the plurality of printing devices, a graphical image to represent the printing device in the network printing device map based on capabilities of the printing device.

10. The method of claim 1, further comprising:
determining a user associated with the print job;
determining whether the user is authorized to execute a print job on the second printing device; and
upon determining that the user is not authorized to execute the print job on the second printing device, displaying a message requesting the user to select a different printing device.

11. The method of claim 1, further comprising:
determining a user associated with the print job;
receiving, from a server, printing device usage history associated with the user; and modifying the network printing device map based on the received printing device usage history associated with the user.

12. A printing device comprising:
a network interface configured to connect to a local network;
a storage medium configured to store a print job;
a network discovery unit configured to communicate with other printing devices via the network interface to receive network topology information;
an operation panel comprising a display unit configured to display a network printing device map and an input unit configured to receive input gestures, wherein the input unit is a touch-screen digitizer overlaid onto the display unit, and wherein receiving the input gesture comprises:
receiving a tap input gesture on a first portion of the touch-screen digitizer corresponding to a graphical object representative of the print job;
receiving a drag input gesture from the first portion of the touch-screen digitizer to a second portion of the touch-screen digitizer corresponding to a graphical object representative of the second printing device; and
receiving a release input gesture at the second portion of the touch-screen digitizer; and
at least one processor configured to execute instructions comprising:
receiving a notification indicating that execution of the print job at the printing device failed;
in response to receiving the notification, displaying the network printing device map on the display unit, wherein the network printing device map is a graphical representation of a network topology of a plurality of printing devices within the local network;
receiving, at the input unit of the operation panel, an input gesture indicative of a selection of a second printing device of the plurality of printing devices with which to execute the print job; and
upon receiving the input gesture, transmitting, via the network interface, the print job stored on the storage medium to the second printing device.

13. The device of claim 12, wherein the instructions further comprise:
transmitting, via the network interface, discovery command packets from the network discovery unit to one or more printing devices of the plurality of printing devices;
receiving, at the network discovery unit, discovery response packets from the one or more printing devices that each represent a portion of the network topology of the plurality of printing devices within the local network; and
generating the network printing device map based on the received discovery response packets.

14. The device of claim 12, wherein the notification is a first notification, and wherein the instructions further comprise:
receiving a second notification indicating that the second printing device is unable to execute the print job; and
displaying a message on the display unit requesting selection of a different printing device.

15. The device of claim 12, wherein the instructions further comprise:
receiving a tap-and-hold gesture on the first portion of the touch-screen digitizer corresponding to the graphical object representative of the print job; and
in response to receiving the tap-and-hold gesture, displaying properties of the print job.

16. The device of claim 12, wherein the instructions further comprise:
receiving a tap-and-hold gesture on the first portion of the touch-screen digitizer corresponding to the graphical object representative of the print job; and
in response to receiving the tap-and-hold gesture, displaying a selectable list of operations that can be executed in association with the print job, wherein the list of operations include (a) canceling the print job, (b) splitting the print job, and (c) displaying properties of the print job.

17. The device of claim 12, wherein the instructions further comprise:
receiving a double-tap gesture on the first portion of the touch-screen digitizer corresponding to the graphical object representative of the second printing device; and
in response to receiving the double-tap gesture, displaying capabilities of the second printing device.

18. A system comprising:
a plurality of printing devices that are each communicatively connected to a local network and configured to perform network topology discovery services, wherein the network topology discovery services include (i) transmitting discovery command packets that request network information from neighboring printing devices and (ii) receiving discovery response packets that represent a portion of a network topology of the local network; and
a computing device communicatively connected to the local network, wherein the computing device comprises a display unit and an input unit, and wherein the computing device is configured to execute instructions comprising:
receiving, from at least one printing device of the plurality of printing devices, one or more discovery response packets;
generating a network printing device map based on the received one or more discovery response packets;
receiving a notification indicating that execution of a print job at a first printing device of the plurality of printing devices failed;
displaying, on the display unit, the generated network printing device map;
receiving, from the input unit via a drag-and-drop operation, a selection of a second printing device of the plurality of printing devices with which to execute the print job, whereby a first graphical object representative of the print job is placed onto a second graphical object representative of the second printing device; and
causing the first printing device to transmit the print job to the second printing device.

* * * * *